US010040728B2

(12) United States Patent
Ovokaitys et al.

(10) Patent No.: US 10,040,728 B2
(45) Date of Patent: Aug. 7, 2018

(54) METHODS AND COMPOSITIONS FOR INCREASING THE BIOACTIVITY OF NUTRIENTS

(71) Applicants: Todd Frank Ovokaitys, Carlsbad, CA (US); Raul Mendez Segura, Huixquilucan (MX); John Scott Strachan, Edinburgh (GB)

(72) Inventors: Todd Frank Ovokaitys, Carlsbad, CA (US); Raul Mendez Segura, Huixquilucan (MX); John Scott Strachan, Edinburgh (GB)

( * ) Notice: Subject to any disclaimer, the term of this patent is extended or adjusted under 35 U.S.C. 154(b) by 202 days.

(21) Appl. No.: 14/731,036

(22) Filed: Jun. 4, 2015

(65) Prior Publication Data

US 2015/0353433 A1 Dec. 10, 2015

Related U.S. Application Data

(60) Provisional application No. 62/144,177, filed on Apr. 7, 2015, provisional application No. 62/009,024, filed on Jun. 6, 2014.

(51) Int. Cl.
*C05B 17/00* (2006.01)
*C05B 17/02* (2006.01)
(Continued)

(52) U.S. Cl.
CPC ............ *C05B 17/00* (2013.01); *C05D 9/02* (2013.01); *C05G 3/00* (2013.01); *C05G 3/0005* (2013.01);
(Continued)

(58) Field of Classification Search
None
See application file for complete search history.

(56) References Cited

U.S. PATENT DOCUMENTS 3,703,576 A 11/1972 Kitajima
4,840,174 A 6/1989 Gluckman
(Continued)

FOREIGN PATENT DOCUMENTS

EP 1011697 6/2000
EP 1292134 A2 3/2003
(Continued)

OTHER PUBLICATIONS

International Search Report for PCT/US15/34236, dated Sep. 18, 2015.

(Continued)

*Primary Examiner* — Wayne Langel
(74) *Attorney, Agent, or Firm* — Novel IP

(57) ABSTRACT

The present specification describes increasing the Brix degree, nutrient transport and density, and yields of crops through the application of photoacoustic resonance to a nutrient formulation. An activated nutrient solution is obtained by forming an unactivated nutrient solution and applying to the unactivated nutrient solution a plurality of ultra-rapid impulses of modulated laser light, from one or more laser systems, wherein said ultra-rapid impulses are defined as impulses with molecular traverse rates ranging from 100 nanoseconds to 0.01 femtoseconds. In one embodiment, an increase of at least 10% in the Brix degree of the crop, relative to an unactivated nutrient formulation, can be achieved. In addition, an increase of at least 10%, relative to an unactivated nutrient formulation, is seen with respect to nutrient density and crop yield through application of the activated nutrient solution.

14 Claims, 8 Drawing Sheets

Table 4. Comparative Brix Degree and Micronutrient Levels (in ppm) for Maize

| Biological Value | Untreated Control (Group 1) | Treated with Unactivated Nutrient Solution (Group 2) | Treated with LASER Activated Nutrient Solution (Group 3) | Ratio of Increase of Mineral Delivery Group 3:Group 2 |
|---|---|---|---|---|
| 601 | 602 | 603 | 604 | 605 |
| Brix Degree | 6 | 8.5 | 9.7 | 1.48 |
| Iodine | 9 | 21 | 24 | 1.25 |
| Mo | 17 | 31 | 36 | 1.36 |
| Fe | 18 | 29 | 34 | 1.45 |
| Zn | 26 | 39 | 44 | 1.38 |
| Mn | 21 | 32 | 37 | 1.45 |
| Cu | 7 | 16 | 20 | 1.44 |

(51) Int. Cl.
| | |
|---|---|
| C05C 11/00 | (2006.01) |
| C05D 1/00 | (2006.01) |
| C05D 5/00 | (2006.01) |
| C05D 9/00 | (2006.01) |
| C05D 9/02 | (2006.01) |
| C05G 3/00 | (2006.01) |
| A01G 22/00 | (2018.01) |
| A01G 1/00 | (2006.01) |
| A01G 7/04 | (2006.01) |

(52) U.S. Cl.
CPC ............ *C05G 3/0052* (2013.01); *A01G 1/001* (2013.01); *A01G 7/04* (2013.01); *A01G 22/00* (2018.02); *C05B 17/02* (2013.01); *C05C 11/00* (2013.01); *C05D 1/00* (2013.01); *C05D 5/00* (2013.01); *C05D 9/00* (2013.01)

(56) References Cited

U.S. PATENT DOCUMENTS

| | | | |
|---|---|---|---|
| 5,571,797 A | 11/1996 | Ohno | |
| 5,874,266 A | 2/1999 | Palsson | |
| 6,064,500 A | 5/2000 | Strachan | |
| 6,447,810 B1* | 9/2002 | Choi | A61K 31/7016 424/114 |
| 6,763,607 B2 | 7/2004 | Beyernick | |
| 6,811,564 B1 | 11/2004 | Strachan | |
| 7,294,508 B2 | 11/2007 | Parikh | |
| 7,427,502 B2 | 9/2008 | Gostjeva | |
| 7,674,620 B2 | 3/2010 | Totey | |
| 7,829,335 B2 | 11/2010 | Inoue | |
| 8,173,632 B2 | 5/2012 | Ovokaitys | |
| 8,313,477 B2 | 11/2012 | See | |
| 8,377,989 B2 | 2/2013 | Ovokaitys | |
| 8,404,733 B2 | 3/2013 | Ovokaitys | |
| 8,748,178 B2 | 6/2014 | Egli | |
| 8,788,213 B2 | 7/2014 | Bright | |
| 2002/0034546 A1 | 3/2002 | Ullah | |
| 2002/0058952 A1 | 5/2002 | Weber | |
| 2003/0163931 A1 | 9/2003 | Beyerinck | |
| 2004/0204746 A1 | 10/2004 | Ovokaitys | |
| 2004/0230257 A1 | 11/2004 | Ovokaitys | |
| 2004/0239044 A1 | 12/2004 | Blatter | |
| 2004/0247671 A1 | 12/2004 | Prescott | |
| 2005/0170506 A1 | 8/2005 | Sayre | |
| 2005/0188921 A1 | 9/2005 | Malone | |
| 2006/0013869 A1 | 1/2006 | Ignatious | |
| 2006/0129210 A1 | 6/2006 | Cantin | |
| 2007/0003615 A1 | 1/2007 | Jenkins | |
| 2007/0154465 A1 | 7/2007 | Kharazi | |
| 2007/0231307 A1 | 10/2007 | Tankovich | |
| 2008/0064099 A1 | 3/2008 | Parikh | |
| 2008/0176332 A1 | 7/2008 | Berns | |
| 2008/0183162 A1 | 7/2008 | Altshuler | |
| 2009/0131376 A1 | 5/2009 | Ovokaitys | |
| 2009/0131710 A1 | 5/2009 | Ovokaitys | |
| 2010/0015576 A1 | 1/2010 | Altshuler | |
| 2010/0068141 A1 | 3/2010 | Kaushal | |
| 2012/0041521 A1 | 2/2012 | Oron | |
| 2012/0101479 A1 | 4/2012 | Paspaliaris | |
| 2012/0129158 A1 | 5/2012 | Berns | |
| 2012/0215156 A1 | 8/2012 | Ishikawa | |
| 2012/0220641 A1 | 8/2012 | Ovokaitys | |
| 2012/0258451 A1 | 10/2012 | Klimanskaya | |
| 2014/0004601 A1 | 1/2014 | Lim | |
| 2014/0093482 A1 | 4/2014 | Paspaliaris | |
| 2014/0128800 A1 | 5/2014 | Kim | |
| 2014/0200503 A1 | 7/2014 | Centurion | |
| 2014/0273207 A1 | 9/2014 | Chan | |
| 2014/0303546 A1 | 10/2014 | Badiavas | |
| 2014/0311200 A1* | 10/2014 | Hartmann | C05B 7/00 71/21 |
| 2014/0345342 A1* | 11/2014 | Ushijima | B01J 2/30 71/11 |
| 2014/0352376 A1* | 12/2014 | Carpenter | C05B 17/00 71/6 |
| 2014/0377831 A1 | 12/2014 | Ho | |
| 2015/0027180 A1* | 1/2015 | Tuttle | C05F 7/00 71/12 |
| 2015/0259767 A1* | 9/2015 | Hilbert | D21H 17/67 423/155 |
| 2015/0343234 A1 | 12/2015 | Ovokaitys | |
| 2015/0353433 A1 | 12/2015 | Ovokaitys | |
| 2017/0233717 A1 | 8/2017 | Ovokaitys | |

FOREIGN PATENT DOCUMENTS

| | | |
|---|---|---|
| EP | 1421181 | 5/2004 |
| EP | 1892290 | 2/2008 |
| EP | 2248888 | 11/2010 |
| JP | 2008194055 | 8/2008 |
| RU | 2291703 | 1/2007 |
| SG | 172471 | 7/2011 |
| WO | 1995029645 | 2/1995 |
| WO | 1996039489 | 2/1996 |
| WO | 1998042356 | 2/1998 |
| WO | 0100563 A1 | 1/2001 |
| WO | 2001068110 | 1/2001 |
| WO | 02059087 A1 | 8/2002 |
| WO | 2003018783 | 1/2003 |
| WO | 2003029402 | 1/2003 |
| WO | 03020291 A1 | 3/2003 |
| WO | 2004071435 A2 | 8/2004 |
| WO | 2004081172 | 9/2004 |
| WO | 2006068649 A1 | 6/2006 |
| WO | 2007014323 | 2/2007 |
| WO | 2007100614 | 9/2007 |
| WO | 2008013985 A2 | 1/2008 |
| WO | 2008089292 | 7/2008 |
| WO | 2009050696 | 4/2009 |
| WO | 2009052246 A1 | 4/2009 |
| WO | 2009052248 A1 | 4/2009 |
| WO | 2010005557 | 1/2010 |
| WO | 2010124585 | 11/2010 |
| WO | 2010134007 | 11/2010 |
| WO | 2011100651 A1 | 8/2011 |
| WO | 2011109797 | 9/2011 |
| WO | 2012071393 | 5/2012 |
| WO | 2012122081 | 9/2012 |
| WO | 2012122081 A2 | 9/2012 |
| WO | 2012131558 | 10/2012 |
| WO | 2012178156 | 12/2012 |
| WO | 2013003557 A1 | 1/2013 |
| WO | 2013063406 | 5/2013 |
| WO | 2013141715 A1 | 9/2013 |
| WO | 2014185945 | 11/2014 |
| WO | 2015053694 | 4/2015 |
| WO | 2015184421 A1 | 12/2015 |
| WO | 2015187974 A1 | 12/2015 |
| WO | 2017083755 A1 | 5/2017 |

OTHER PUBLICATIONS

International Search Report for PCT/US17/049976, dated Dec. 20, 2017.
Johnston, "The First Illinois Cannabis Farm", Nov. 19, 2015 (Nov. 19, 2015), retrieved on Nov. 17, 2017, https://www.agriculture.com/crops/other-crops/specialty-crops/first-illinois-cnabis-farm_168-ar51209; entire document.
Brenneisen, "Chemistry and Analysis of Phytocannabinoids and Other Cannabis Constituents", (2007), In: ElSohly M.A. (eds) Marijuana and the Cannabinoids. Forensic Science and Medicine. Humana Press.; entire document.
International Search Report for PCT/US16/61673, dated Mar. 2, 2017.
International Search Report for PCT/US11/24694, dated Apr. 25, 2011.
International Search Report for PCT/US04/03752, dated Sep. 7, 2006.
International Search Report for PCT/US08/80098, dated Feb. 20, 2009.

(56) References Cited

OTHER PUBLICATIONS

International Search Report for PCT/US15/33425, dated Sep. 29, 2015.
Gatrix, "Supplementing with Light." www.cam-mag.com, CAM Nov. 2012 (2012), enitre document [online] URL=<http://perfect-tp.dyndns-ip.com/DT/perfect/images/mg_cam.pdf>.
International Search Report for PCT/US08/80095, dated Dec. 16, 2008.
Ong, Wei-Kee et al., The activation of directional stem cell motility by green light-emitting diode irradiation, Dec. 19, 2012, Biomaterials, 34: pp. 1911-1920.
Office Action dated Nov. 3, 2016 for U.S. Appl. No. 14/726,457.
Office Action dated Jul. 21, 2017 for U.S. Appl. No. 14/726,457; (pp. 1-18).
Taylor et al., "Banking on human embryonic stem cells: estimating the number of donor cell lines needed for HLA matching", Lancet, Dec. 10, 2005; 366: pp. 2019-2025.
Office Action dated Aug. 10, 2017 for U.S. Appl. No. 15/349,886; (pp. 1-26).
Office Action dated Dec. 27, 2017 for U.S. Appl. No. 14/726,457; (pp. 1-7).
Extended European Search Report for EP15799255.3, dated Feb. 1, 2018.

\* cited by examiner

Table 1. Acute Daily Difference in Brix Degree Between 7 AM and 7:45 AM Measurement.

| Day | Untreated Control | Treated with Unactivated Nutrient Solution | Treated with LASER Activated Nutrient Solution |
|---|---|---|---|
| 1 | 0 | 0.9 | 1.6 |
| 2 | 0 | 0.8 | 1.2 |
| 3 | 0 | 0.8 | 1.5 |
| 4 | -0.2 | 1.2 | 1.3 |
| 5 | 0 | 0.8 | 1.3 |
| 6 | 0 | 0.8 | 1.6 |
| 7 | -0.3 | 1.0 | 1.9 |
| 8 | 0 | 0.9 | 1.9 |
| 9 | -0.2 | 0.9 | 1.9 |
| 10 | -0.1 | 1.1 | 1.9 |

FIG. 4A

Table 2. Brix Degree Values at 7 AM and 7:45 AM Over 10 Days.

| Day | Untreated Control | | Treated with Unactivated Nutrient Solution | | Treated with LASER Activated Nutrient Solution | |
|---|---|---|---|---|---|---|
| | 7:00 AM | 7:45 AM | 7:00 AM | 7:45 AM | 7:00 AM | 7:45 AM |
| 1 | 8.0 | 8.0 | 8.0 | 8.9 | 8.0 | 9.6 |
| 2 | 7.5 | 7.5 | 8.2 | 9.0 | 8.8 | 10.0 |
| 3 | 8.0 | 8.0 | 8.0 | 8.8 | 9.0 | 10.5 |
| 4 | 8.0 | 7.8 | 8.0 | 9.2 | 9.2 | 10.5 |
| 5 | 8.0 | 8.0 | 8.5 | 9.3 | 9.5 | 10.8 |
| 6 | 8.5 | 8.5 | 8.7 | 9.5 | 9.4 | 11.0 |
| 7 | 8.3 | 8.0 | 8.5 | 9.5 | 9.5 | 11.4 |
| 8 | 8.5 | 8.5 | 8.7 | 9.6 | 9.6 | 11.5 |
| 9 | 8.4 | 8.2 | 8.9 | 9.8 | 9.8 | 11.7 |
| 10 | 8.2 | 8.1 | 9.0 | 10.1 | 10.0 | 11.9 |

FIG. 4B

Table 3. Results in Metric Tons per Hectare of Production.

| Control (Group 1) | Treated with Unactivated Nutrient Solution (Group 2) | Treated with LASER Activated Nutrient Solution (Group 3) |
|---|---|---|
| 3.9158 | 4.9883 | 6.6467 |

FIG. 5

Table 4. Comparative Brix Degree and Micronutrient Levels (in ppm) for Maize

| Biological Value | Untreated Control (Group 1) | Treated with Unactivated Nutrient Solution (Group 2) | Treated with LASER Activated Nutrient Solution (Group 3) | Ratio of Increase of Mineral Delivery Group 3:Group 2 |
|---|---|---|---|---|
| Brix Degree | 6 | 8.5 | 9.7 | 1.48 |
| Iodine | 9 | 21 | 24 | 1.25 |
| Mo | 17 | 31 | 36 | 1.36 |
| Fe | 18 | 29 | 34 | 1.45 |
| Zn | 26 | 39 | 44 | 1.38 |
| Mn | 21 | 32 | 37 | 1.45 |
| Cu | 7 | 16 | 20 | 1.44 |

FIG. 6

Table 5. Results in Kg per Hectare of Production.

| Control (Group 1) | Treated with Unactivated Nutrient Solution (Group 2) | Treated with LASER Activated Nutrient Solution (Group 3) |
|---|---|---|
| 484 | 593.5 | 769 |

FIG. 7

Table 6. Comparative Micronutrient Levels (in ppm) for Beans

| Biological Value | Untreated Control (Group 1) | Treated with Unactivated Nutrient Solution (Group 2) | Treated with LASER Activated Nutrient Solution (Group 3) | Ratio of Increase of Mineral Delivery Group 3:Group 2 |
|---|---|---|---|---|
| Cu | 0 | 1-2 | 5-10 | 5.0 |
| Zn | 7-9 | 15-20 | 35-45 | 3.5 |
| Fe | 17-25 | 34-50 | 125-140 | 6.4 |

FIG. 8

METHODS AND COMPOSITIONS FOR INCREASING THE BIOACTIVITY OF NUTRIENTS

CROSS-REFERENCE

The present specification relies on U.S. Patent Provisional Application No. 62/009,024, filed on Jun. 6, 2014 and entitled "Methods and Compositions for Increasing the Bioactivity of Nutrients" and U.S. Patent Provisional Application No. 62/144,177, filed on Apr. 7, 2015 and entitled "Methods and Compositions for Increasing the Bioactivity of Nutrients". Both applications are herein incorporated by reference.

FIELD

The present specification is directed toward methods and compositions for increasing the bioactivity of nutrients and, more specifically, for increasing the bioactivity of nutrients through the application of photo-acoustic resonance to increase the yield of agricultural products.

BACKGROUND

Plant nutrients, which come primarily from chemical fertilizers, manure, and in some cases sewage sludge, are essential for crop production. When applied in proper quantities and at appropriate times, nutrients (especially nitrogen, phosphorus, and potassium) help achieve optimum crop yields. The profit potential for farmers depends on producing enough crops per hectare to keep production costs below the selling price. Efficient application of the correct types and amounts of fertilizers for the supply of the nutrients is an important part of achieving profitable yields. Further, to meet the continuously increasing demand for food commodities, it is important to increase the nutrient density of nutrients applied to agricultural crops and develop methods for plants to absorb these nutrients more efficiently, thereby helping farmers increase their crop output.

Nutrient density can be defined as the quantity of a nutrient per unit of weight of produce or sap. It is generally expressed in terms of grams/100 grams, as a percentage of weight of the given nutritional component in total weight for high quantity substances as in sucrose.

The sugar available to the plants from an applied nutrient solution may be measured in degrees Brix (°Bx), which is defined as the sugar content of an aqueous solution. One degree Brix is 1 gram of sucrose in 100 grams of solution and represents the strength of the solution as percentage by weight (% w/w). The Brix degree can also be expressed as parts per million by weight in components present in relative trace amounts.

It is known that for every one point increase in the Brix degree, a series of beneficial results, related to greater nutrient transport, occur, including, but not limited to, enhanced transport of nutrients into the cellular substance of the plant, increased sugar and protein content of the food, higher nutrient density for a given application of nutrients, greater resistance to pests and pathological microbes (on the order of 50% or greater improvement in resistance relative to crops treated with unactivated nutrients), and significantly higher yields of produce per plant per hectare cultivated.

Additionally, it is generally known that energy is an important component of all matter. This understanding is a key basis in evolution of industries that began to shift toward energy and electronics. However, agriculture has yet to evolve on the basis of this understanding.

Thus there is a need for improving large scale agricultural food production and the nutrient density of crops. There is also a need to enhance the transport of nutrients in an organism in order to increase the food item's Brix degree or other nutrient values. Accordingly, there is a need for methods and compositions to enhance the transport of nutrients, increase the Brix degree, and reliably achieve the above listed biological effects for a wide variety of nutrients and food items.

SUMMARY

The present specification is directed toward increasing the Brix degree of crops through the application of photoacoustic resonance to a nutrient formulation, forming an activated nutrient formulation.

In one embodiment, an increase of at least 10% in the Brix degree of the crop, relative to an unactivated nutrient formulation, can be achieved by treating the crop with an a laser activated nutrient solution. In addition, an increase of at least 10%, relative to an unactivated nutrient formulation, is seen with respect to nutrient density and crop yield through application of the activated nutrient solution.

In some embodiments, the present specification discloses a nutrient solution for applying to agricultural products prepared by a process comprising the steps of: forming an unactivated nutrient solution; and applying to said unactivated nutrient solution a plurality of ultra-rapid impulses of modulated laser light, wherein said ultra-rapid impulses are defined as impulses with molecular traverse rates on the order of 100 nanoseconds to 0.01 femtoseconds.

Optionally, the unactivated nutrient solution comprises water (H2O) and at least one of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), Chromium (Cr) and zinc (Zn).

Still optionally, the unactivated nutrient solution comprises at least one of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), Chromium (Cr) and zinc (Zn).

Optionally, said modulated laser light is applied from at least one laser to said unactivated nutrient solution. Optionally, said at least one laser has a wavelength in a range of 400 to 750 nanometers and a power output in the range of 1 to 1000 milliwatts, when adjusted for the minimum degree of phase cancellation of the laser output. Still optionally, said at least one laser has a power output in the range of 0.4 to 400 milliwatts, when adjusted to 60% phase cancellation.

Optionally, the unactivated nutrient solution is housed in a container and wherein said at least one laser emits a beam that is configured to be applied to the nutrient solution at a trajectory that allows a full traverse of the beam from a first surface of the container to an opposing surface of the container. Still optionally, the unactivated nutrient solution is housed in a first container and transported to a second container via a conduit, wherein at least one laser emits a beam that is configured to be applied to the nutrient solution at a trajectory that allows a full traverse of the beam through said conduit.

Optionally, the laser light is modulated with an optical device comprising a first diffraction grating, a refractive element, and a second diffraction grating and wherein the optical device cancels a portion of the laser radiation to produce a pattern of interference of constructive and destructive nodes. Still optionally, the laser light is modulated such that a substantial majority of destructive nodes are generated relative to constructive nodes.

In some embodiments, after application of the nutrient solution of the present specification to an untreated agricultural product, within one hour after said application, the resultant treated agricultural product exhibits an increased Brix degree in a range of 10%-50% relative to the untreated agricultural product.

In some embodiments, after application of the nutrient solution of the present specification to an untreated agricultural product, by the end of a growing season, the resultant treated agricultural product has an increased yield per hectare in a range of 10% to 50% relative to the untreated agricultural product.

In some embodiments, after application of the nutrient solution of the present specification to an untreated agricultural product, by the end of a growing season, the resultant treated agricultural product delivers an enhanced transport of nutrients to its cells and sap of 10% to 400% greater relative to the untreated agricultural product.

In some embodiments, after application of the nutrient solution of the present specification to an untreated agricultural product, within one hour after said application, the resultant treated agricultural product has an 10% to 50% increased amount of at least one of sugar content or protein content relative to the untreated agricultural product.

In some embodiments, after application of the nutrient solution of the present specification to an untreated agricultural product, by the end of a growing season, the resultant treated agricultural product has a 10% to 400% higher nutrient density relative to the untreated agricultural product.

In some embodiments, after application of the nutrient solution of the present specification to an untreated agricultural product, within one hour after said application, the resultant treated agricultural product has a 50% or greater resistance to pests and pathological microbes relative to the untreated agricultural product.

In some embodiments, the present specification is directed towards a method of cultivating agricultural products comprising applying the nutrient solution of the present specification to a plurality of said agricultural products, wherein after said application, by the end of a growing season, a portion of the plurality of said agricultural products have an increased yield per hectare in a range of 10% to 50% relative to agricultural products cultivated with an unactivated nutrient solution.

In some embodiments, the present specification is directed towards a method of cultivating agricultural products comprising applying the nutrient solution of the present specification to a plurality of said agricultural products, wherein, within one hour after said application, a portion of the plurality of said agricultural products have an increased Brix degree in a range of 10% to 50% relative to agricultural products cultivated with an unactivated nutrient solution.

Optionally, the agricultural products comprise at least one of wheat, rice, maize (corn), millet, barley, rye, amaranth, sugarcane, pumpkin, cassava, soybeans, beans, mung beans, lentils, hay, potatoes, cotton, rapeseed, radish, lettuce, broccoli, spinach, carrots, green peas, cucumber, tomatoes, peppers, onions, coffee, tea, chicory, peanuts, rubber, yams, sunflowers, palms, mustard, coconuts, cocoa, olives, nuts including almonds, walnuts and cashews, and other grains, nut, vegetables and fruits.

Optionally, the modulated laser light is applied from three lasers. Still optionally, the modulated laser light is applied from four lasers.

In some embodiments, the present specification discloses a method of applying photoacoustic stimulation to a nutrient solution to improve an efficacy of said nutrient solution, the method comprising the steps of: passing a laser beam through an optical element for phase cancellation; setting a diameter of the laser beam to a multiple of a wavelength of a beat frequency such that it allows a substantial Fresnel zone to be apparent to the beam; adjusting an optical element to increase a number of destructive nodes compared to a number of constructive nodes; modulating a frequency of the laser beam to a harmonic of a specific molecular resonance; and applying the laser beam to said nutrient solution.

In some embodiments, the present specification discloses a nutrient solution for applying to agricultural products prepared by a process comprising the steps of: forming an unactivated nutrient solution; and applying to said unactivated nutrient solution a plurality of impulses of modulated laser light, wherein said impulses have molecular traverse rates on the order of 100 nanoseconds to 0.01 femtoseconds.

In some embodiments, the present specification discloses a nutrient solution for applying to agricultural products prepared by a process comprising the steps of: forming an unactivated nutrient solution; and applying to said unactivated nutrient solution a plurality of pulses of modulated laser light, wherein said pulses are ultra-rapidly modulated and have a high repetition frequency.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 4A is a table listing Brix values for control plants, grown only with a conventional nutrient protocol; plants treated with an unactivated nutrient formulation; and plants treated with an activated nutrient formulation, in accordance with one embodiment of the present specification;

FIG. 4B is a table listing actual Brix values over time for control plants, grown only with a conventional nutrient protocol; plants treated with an unactivated nutrient formulation; and plants treated with an activated nutrient formulation, in accordance with one embodiment of the present specification;

FIG. 5 is a table showing crop yields in metric tons per hectare for control plants, grown only with a conventional nutrient protocol; plants treated with an unactivated nutrient formulation; and plants treated with an activated nutrient formulation, in accordance with one embodiment of the present specification;

FIG. 6 is a table showing comparative brix degree and micronutrient levels (in ppm) for maize for control plants, grown only with a conventional nutrient protocol; plants treated with an unactivated nutrient formulation; and plants treated with an activated nutrient formulation, in accordance with one embodiment of the present specification;

FIG. 7 is a table showing crop yields in Kg per hectare for control beans, grown only with a conventional nutrient protocol; beans treated with an unactivated nutrient formulation; and beans treated with an activated nutrient formulation, in accordance with one embodiment of the present specification; and, FIG. 8 is a table showing comparative brix degree and micronutrient levels (in ppm) for beans for control plants, grown only with a conventional nutrient protocol; plants treated with an unactivated nutrient formulation; and plants treated with an activated nutrient formulation, in accordance with one embodiment of the present specification.

DETAILED DESCRIPTION

In one embodiment, the present specification discloses a method of increasing the nutrient density and Brix value derived from applying activated nutrient formulations or solutions to crops, thus increasing the potency and efficacy of the nutrients supplied to the plants, which in turn improves the yield and quality of the crop. In one embodiment, photoacoustic stimulation is applied to a nutrient formulation to create an activated nutrient formulation which results in improved nutrient density in the crop when compared with an application of the unactivated nutrient formulation to crops.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Molecular resonance generated by laser radiation can be used for direct stimulation of natural biological processes as described in U.S. Pat. No. 6,811,564, which is incorporated herein by reference in its entirety.

Figure 1A:
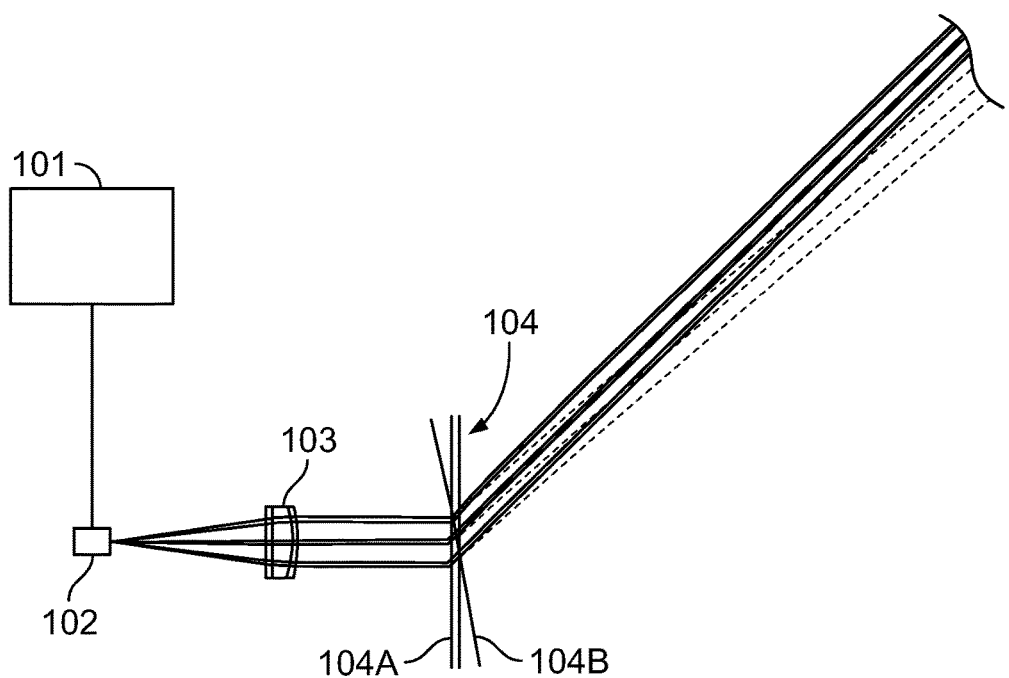
FIG. 1A is a diagram illustrating an optical system for the modulation of a laser beam, in accordance with one embodiment of the present specification.

FIG. 1A is a diagram illustrating an optical system for the modulation of a laser beam, in accordance with one embodiment of the present specification. Referring to FIG. 1A, the apparatus comprises a laser diode 102 which is controlled by an amplitude modulator 101. The laser diode 102 is selected such that it has a substantially linear relationship between current and wavelength with minimum mode hopping. The amplitude modulator 101 modulates the current directed to the laser diode which in turn results in a very small wavelength modulation of the laser.

Figure 1B:
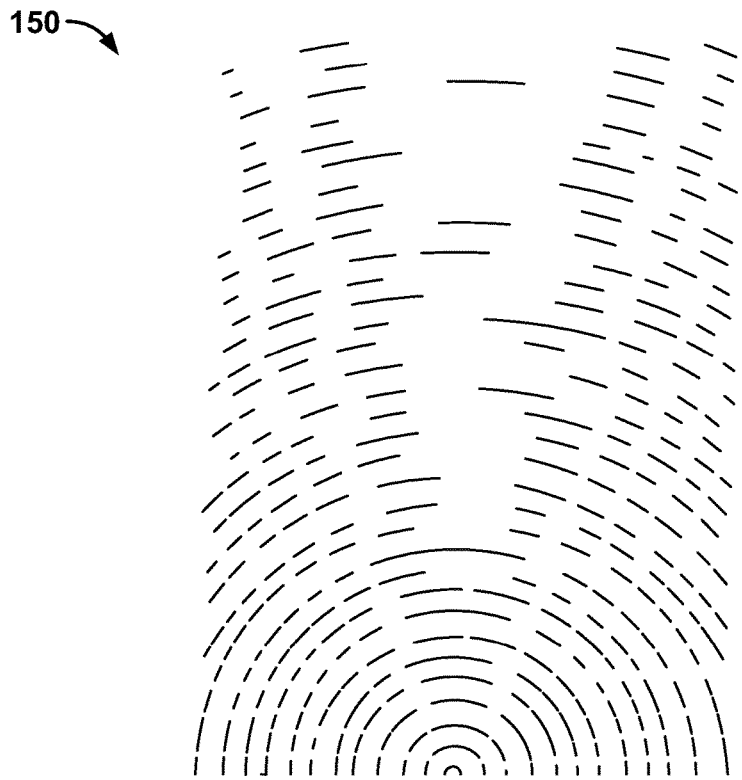
FIG. 1B is an illustration of an interference pattern produced by the system of FIG. 1.

The output of the laser diode 102 is collimated by a lens 103 and propagated towards an optical element 104. In one embodiment, the optical element 104 consists of a first diffraction grating, a refractive element, and a second diffraction grating such that the beam is substantially cancelled. An exemplary form of an optical element is disclosed in U.S. Pat. No. 6,064,500, which is incorporated herein by reference in its entirety. This allows the cancellation to occur over a small percentage of the wavelength variance of the laser source, rather than at a single critical wavelength. Wavelengths beyond the acceptance bandwidth of the cancelling optical element 104 above and below the center frequency pass without being cancelled. This means that a complex Fresnel/Fraunhoffer zone will be generated, defined by the beat frequency of the high and low frequencies as a function of the aperture. Therefore, relatively sparse zones of constructive interference will occur between the high and low frequency passes of the cancellation element in selected directions from the aperture, as shown by the interference pattern 150 in FIG. 1B.

As seen in FIG. 1A, the optical element can be adjusted angularly between positions 104A and 104B. In an embodiment, the output of the laser diode is normal to the plane of the optical element 104A. This varies the ratio of constructive to destructive interference. In effect, the continuous beam is transformed into a string of extremely short duration pulses typically of sub-femtosecond duration. A nanosecond is a billionth of a second, and a femtosecond is a billionth of a nanosecond. The small wavelength modulation of the laser diode 102 causes the constructive and destructive nodes to move rapidly through the volume of the Fresnel zone of the collimator lens aperture. This has the effect of simulating very short (sub-picosecond) pulse behavior at any point in the Fresnel zone through which the nodes pass at a pulse repetition frequency defined by the amplitude modulator frequency.

If the beat frequency is made high enough, the wavelength of the cancelled to non-cancelled cycle can be a fraction of a practical aperture. This will cause the wavelength to be sufficiently small, thus limiting the Feynman paths to within a cycle or two in free space allowing the Fresnel/Fraunhoffer effect to be apparent. Since the center frequency and spectrum spread of a laser diode is easily modulated by adjusting the current and/or temperature of the junction, the pattern of the Fresnel/Fraunhoffer zones can be varied dramatically by very small variations in the wavelength of one or both pass frequencies. Such modulation is produced in the apparatus of FIG. 1A by the amplitude modulator 101.

In effect, to the degree to which the optical device is adjusted to increase the destructive interference, the nodes become commensurately sparser, the measurable light output decreases, and the depth of penetration of the nodes through a medium increases.

As mentioned above, the effective pulse repetition frequency of such nodes can reach impulse rates as fast as sub-femtoseconds. As molecular bond rotations and vibrations occur at rates on the order of 10 femtoseconds, the output of this device can meet or exceed such rates and entrain resonance of molecular bond vibrations. As demonstrated by Ovokaitys and Strachan in U.S. Pat. No. 8,377,989, also incorporated herein by reference in its entirety, this type of stimulation can build the free energy of chemical bonds in a system in which high free energy states of matter, such as room temperature stable non-crystalline aspirin, become possible.

In one embodiment, modulated laser stimulation is applied to nutrient and nutrient formulations. In one embodiment, photoacoustic laser stimulation is applied to nutrient and nutrient formulations. Preferably, the modulated laser stimulation is a modulated impulse stimulation, as described above, which, when applied to nutrient and nutrient formulations, is found to have a profound effect on increasing the potency and efficacy of the nutrients. An impulse is a construct of the fluctuating traverse of sparse nodes as an interference pattern produced by relationships between holograms and the rapid and slight movement of center point of laser wavelength, rather than simply in a fixed pulse produced from, for example, an LRC circuit or other pulse wave form generator. In a sense, the impulse is a construct of interference fringe phenomena and beat frequencies, rather than a precisely defined pulse. In one embodiment, the impulse stimulation is ultra-rapid. For purposes of this specification, ultra-rapid impulses are defined as impulses with molecular traverse rates ranging from 100 nanoseconds to 0.01 femtoseconds. A molecular traverse rate can be defined as the time it takes for the impulse to go from one end to the other end of a molecule. Accordingly, an impulse may be viewed as an ultra-rapidly modulated beam with a high pulse repetition frequency. Notwithstanding the above, it should be appreciated that the compositions and methods disclosed herein are not limited to the use of impulse stimulation or ultra-rapid impulse stimulation and may be implemented using less than ultra-rapid impulse stimulation or other forms of modulation laser stimulation.

Figure 2:
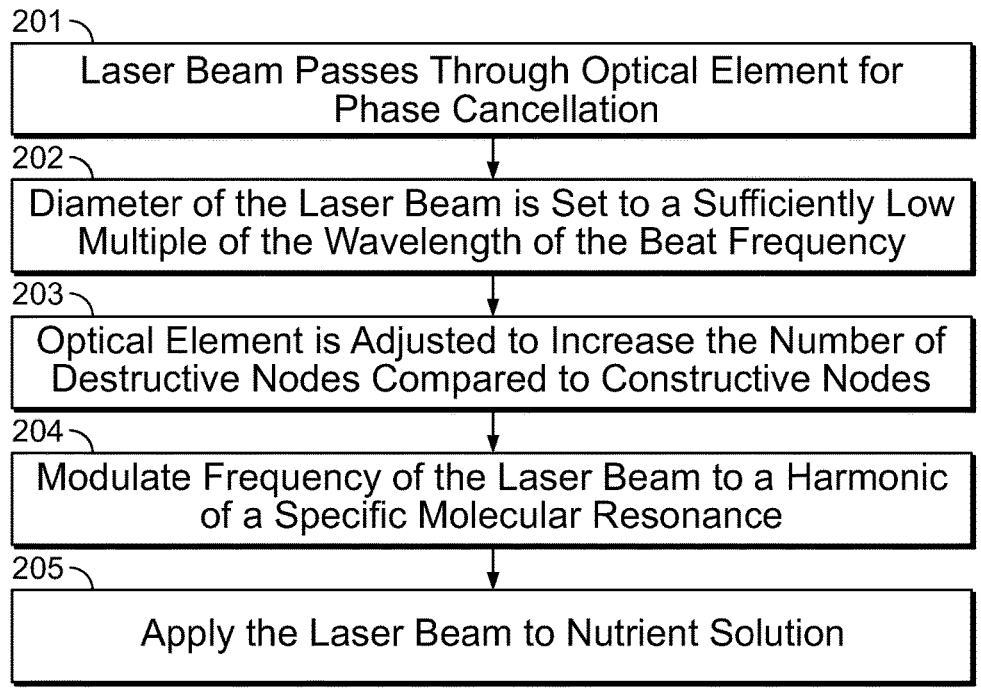
FIG. 2 is a flowchart describing a method of photoacoustic stimulation of a nutrient solution, in accordance with one embodiment of the present specification.

FIG. 2 is a flowchart listing the steps involved in a method of photoacoustic stimulation of a nutrient or nutrient formulation, in accordance with one embodiment of the present specification to form an activated nutrient or nutrient formulation. Referring to FIG. 2, in step 201, a collimated or near collimated laser beam from a laser diode is passed through a phase cancellation optical element. The optical element cancels several of the central lines of the laser frequency while leaving the higher and lower frequencies generally intact, such that the beat frequency of the passed frequencies forms a pattern of interference of constructive and destructive nodes. In step 202, the diameter of the laser beam is set to a sufficiently low multiple of the wavelength of the beat frequency to allow a substantial Fresnel zone to be apparent in the beam. Thereafter, in step 204, the optical element is adjusted to obtain the desired ratio of constructive to destructive interference. In one embodiment, the optical element is adjusted such that the number of destructive nodes is in substantial majority relative to the constructive nodes. The constructive interference only occurs over ultra-short time periods, and, thus, results in ultra-short pulses of light. These small, directed bursts of light are modulated at the frequency of the desired molecule, as shown in step 204, resulting in the desired molecular resonance effect.

Figure 3A:
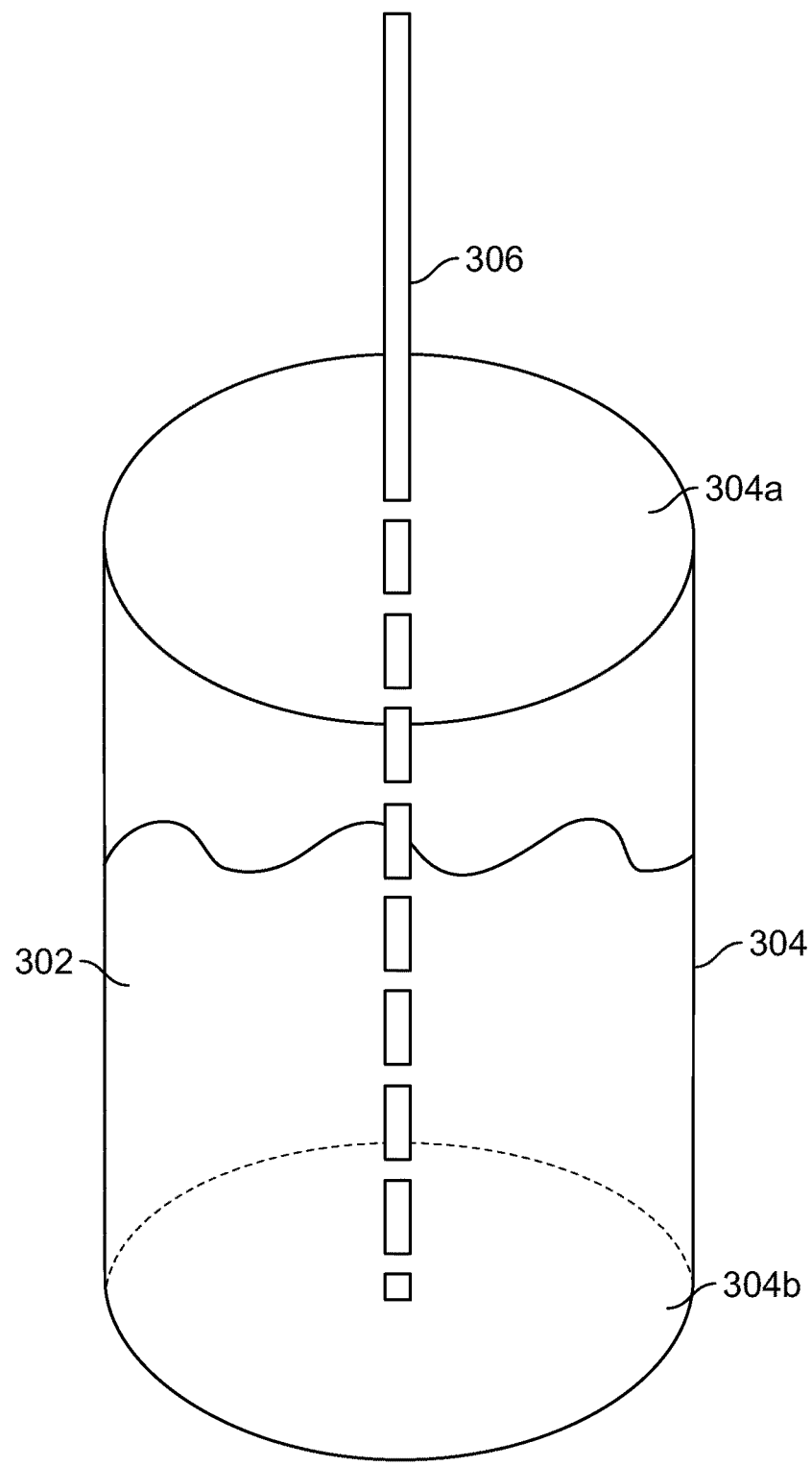
FIG. 3A is a diagram showing one method for applying a modulated laser beam to a nutrient solution.
Figure 3B:
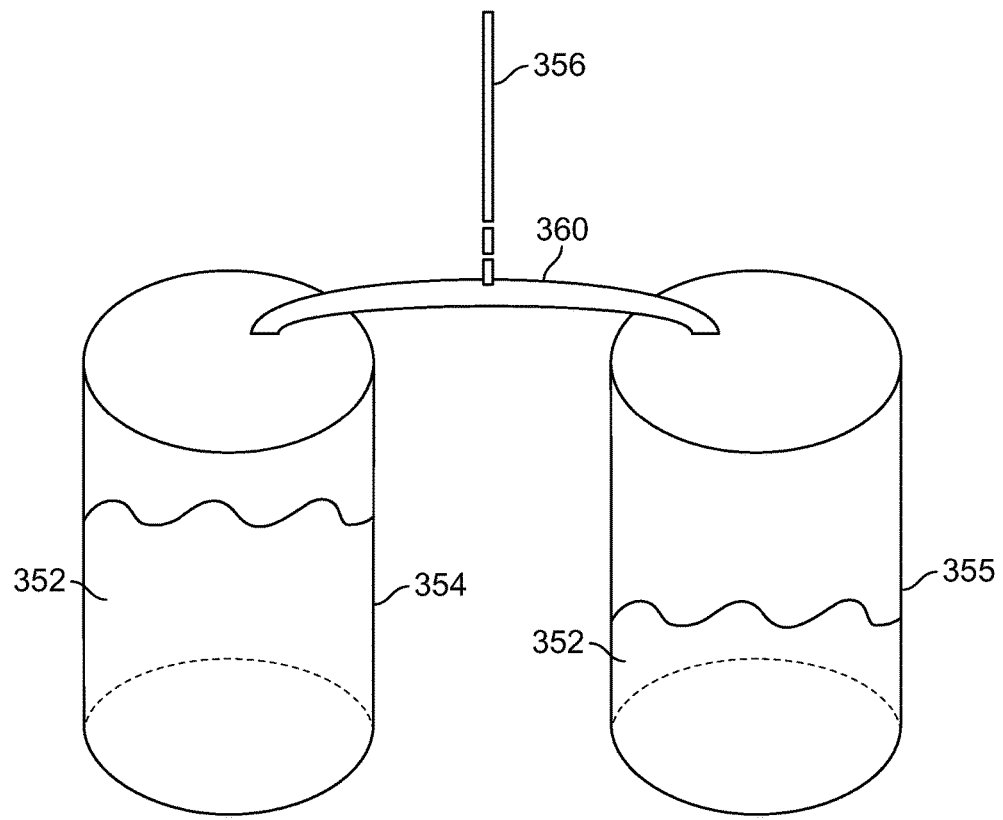
FIG. 3B is a diagram showing another method for applying a modulated laser beam to a nutrient solution.

The modulated laser beam is then applied to a desired nutrient solution in step 205. In one embodiment, as shown in FIG. 3A, a quantity of nutrient solution 302 is housed in a container 304. At least one laser emits a beam 306 that is configured to be applied to the nutrient solution 302 at a trajectory that allows a full traverse of the beam 306 from and/or through a first surface 304a of the container to an opposing surface 304b of the container.

In another embodiment, a quantity of nutrient solution 352 is housed in a first container 354 and transported to a second container 355 via a conduit 360, which is in fluid communication with both first container 354 and second container 355. At least one laser emits a beam 356 that is configured to be applied to the nutrient solution 352 at a trajectory that allows a full traverse of the beam 356 through the conduit 360 such that the nutrient solution is activated as it passes through the conduit 360. While the laser is shown to interact with the container or conduit vertically, it should be appreciated that the laser can interact in any direction provided the trajectory allows a full traverse of the beam through the nutrient solution.

In one embodiment, photoacoustic stimulation or resonance (PAR), as described above, is applied to a nutrient solution to create an activated nutrient solution. In an embodiment, photoacoustic stimulation is applied to a wet nutrient solution. In another embodiment, photoacoustic stimulation is applied to individual nutrients which may be combined to create a nutrient solution or formulation.

In various embodiments, each laser has a wavelength in a range of 400 to 750 nanometers. Each system was adjusted to 60% phase cancellation so the measured power output of the systems after this adjustment was in the range of 0.7 to 2.2 milliwatts, with an average of 1.2 milliwatts per system.

In an embodiment, the nutrient solution comprises, individually or in combination, water ($H_2O$) and one or more of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), chromium (Cr) and zinc (Zn).

In an embodiment, the nutrient solution comprises, individually or in combination, one or more of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), chromium (Cr) and zinc (Zn).

The nutrient solution, in some embodiments, comprises compounds such as urea, ammonium phosphate, ammonium nitrate, ammonium sulfate, potash and gypsum, individually or in combination with other compounds and elements.

In some embodiments, some or all of the components of the nutrient solution are sourced from at least one of the following ingredients: kelp, dry fish, sea bird guano, fulvic acids, and/or free iodine. It should be appreciated that one of ordinary skill in the art could obtain any of the aforementioned nutrient elements or compounds from any source and that the present inventions are not limited to particular sources of nutrients.

In one embodiment, when an activated nutrient solution is applied to agricultural crops, several benefits occur. First, crop yields increase in a range of 10% to 50%, including any increment therein, relative to crops treated with the same, but unactivated, nutrient solution. Second, crops experience an increase in Brix degree in a range of 10% to 50%, including any increment therein, relative to crops treated with the same, but unactivated, nutrient solution.

In some embodiments, when an activated nutrient solution is applied to an agricultural product, within one hour of said application, the treated agricultural product exhibits an increased Brix degree in a range of 10% to 50% relative to crops treated with the same, but unactivated, nutrient solution within one hour of said application.

For the purposes of this specification, a growing season can be defined as when a crop is harvested, after a growing period initiating with the planting of a seed, where the growing period can be from 2-3 weeks for fast growing crops, such as for radish, lettuce, broccoli, spinach, onion, carrot green peas, cucumber, pepper and tomatoes, to ten months or more for slower growing crops, such as wheat.

In some embodiments, when an activated nutrient solution is applied to an agricultural product, by the end of the growing season, the treated agricultural product has an increased yield per hectare in a range of 10% to 50% relative to crops treated with the same, but unactivated, nutrient solution.

In some embodiments, when an activated nutrient solution is applied to an agricultural product, by the end of a growing season, the treated agricultural product delivers an enhanced transport of nutrients to its cells and sap in a range of 10% to 400% greater relative to crops treated with the same, but unactivated, nutrient solution.

In some embodiments, when an activated nutrient solution is applied to an agricultural product, within one hour after said application, the treated agricultural product has an 10% to 50% increased amount of at least one of sugar content or protein content relative to crops treated with the same, but unactivated, nutrient solution.

In some embodiments, when an activated nutrient solution is applied to an agricultural product, by the end of a growing season, the treated agricultural product has a 10% to 400% higher nutrient density relative to relative to crops treated with the same, but unactivated, nutrient solution.

In some embodiments, when an activated nutrient solution is applied to an agricultural product, within one hour after said application, the treated agricultural product has a 50% or greater resistance to pests and pathological microbes relative to relative to crops treated with the same, but unactivated, nutrient solution.

In some embodiments, when an activated nutrient solution is applied to a plurality of agricultural products, by the end of a growing season, a portion of the plurality of said agricultural products have an increased yield per hectare in a range of 10% to 50% relative to agricultural products cultivated with the same, but unactivated, nutrient solution.

In some embodiments, when an activated nutrient solution is applied to a plurality of agricultural products, within one hour after said application, a portion of the plurality of said agricultural products have an increased Brix degree in a range of 10% to 50% relative to agricultural products cultivated with the same, but unactivated, nutrient solution.

Such crops include, but are not limited to, wheat, rice, maize (corn), millet, barley, rye, amaranth, sugarcane, pumpkin, cassava, soybeans, beans, mung beans, lentils, hay, potatoes, cotton, rapeseed, radish, lettuce, broccoli, spinach, carrots, green peas, cucumber, tomatoes, peppers, onions, coffee, tea, chicory, peanuts, rubber, yams, sunflowers, palms, mustard, coconuts, cocoa, olives, nuts including almonds, walnuts and cashews, and other grains, vegetables and fruits.

Example 1. Tomatoes

In one embodiment, a nutrient formulation or solution was prepared consisting of kelp and iodine. Kelp provides protein and a wide array of micronutrients to support cellular metabolism and growth.

In one embodiment, a container of 400 liters of the nutrient formulation was treated with an array of four lasers. Each laser had a wavelength of 674 nanometers and a power output in the range of 1.9 to 5.2 milliwatts after passing through the optical device when adjusted for the minimum degree of phase cancellation of the laser output.

All four beams were applied to the nutrient solution at a trajectory allowing a full traverse of the beam from the surface to the bottom or opposite side of the container or conduit carrying the nutrient solution. In one embodiment, application time of the beam was 20 minutes for each system. Thus, there was approximately 96 milliwatt-minutes of visible residual beam applied to 400 liters of nutrient solution to complete the treatment, or about 0.24 milliwatt-minutes per liter.

The nutrient formulation, thus activated by photoacoustic resonance (PAR), was then studied for its effects on tomatoes compared to both control tomatoes and tomatoes treated with the unactivated nutrient formula. There were 100 plants in each group. The control group was treated with only conventional fertilizers and/or nutrients. The plants given the unactivated formula received, in addition to the conventional fertilizers and/or nutrients, an unactivated 1% solution (10 ml of the kelp and iodine formula in 1000 ml of water) as a foliar spray onto the leaves each day at 7 AM for 10 days. The dosage was approximately 10 ml per application per plant. The plants given the activated formula received a 1% solution as a foliar spray each day at 7 AM for 10 days, approximately 10 ml per application per plant.

Five plants from each of the three treatment groups were chosen randomly each day and the Brix degree of each of these plants was measured at 7 AM and then again at 7:45 AM. As stated above, the sugar available to the plants from an applied nutrient solution may be measured in degrees Brix (°Bx), which is defined as the sugar content of an aqueous solution. One degree Brix is equal to 1 gram of sucrose in 100 grams of solution and represents the strength of the solution as percentage by weight (% w/w). The difference between the Brix degree for each plant at 7 AM and at 7:45 AM was calculated (Brix degree at 7:45 AM minus Brix degree at 7 AM). For every set of 5 plants tested, the average of the 5 measured differences is stated in the table shown in FIG. 4A. As can be seen from the table, the average Brix degree difference for plants treated with the PAR activated formula 403 is higher than that of plants to which unactivated formula 402 or no formula (control) 401 was applied. Averaged over the 10 day period, the plants with the unactivated nutrient solution experienced an average Brix degree increase of 0.92 while the plants with activated nutrient solution experienced an average Brix degree increase of 1.61, an increase of approximately 75%.

FIG. 4B is a table listing the Brix Degree values measured at 7 AM and 7:45 AM over 10 days for the set of plants treated as described above. As seen from the results of Day 1 451 in the table, the values for the control tomatoes that received no additional treatment 452 were maintained at a Brix level of 8, which is considered to be a reasonably good value by those of ordinary skill in the art. The plants treated with unactivated formula 453 produced an average 0.9 point degree increase in Brix degree in only 45 minutes. In contrast, the tomatoes given the formula activated with the stated process 454 showed an even more brisk increase in Brix degrees; nearly double that of the unactivated formula, at 1.6 Brix degrees in 45 minutes. Similar trends were observed in the results for other days as well. The tomatoes treated with the activated formula yielded results that were statistically significantly greater than those obtained with the control tomatoes and the tomatoes treated with the unactivated formula.

It may also be observed that in cumulative results, while the control tomatoes maintained a stable Brix degree, the unactivated formula produced results that were statistically significantly better with a cumulative Brix increase of 2 degrees over 10 days. However, the PAR activated formula gave results that were statistically significantly better than both the control tomatoes and those treated with the formula not activated by the stated process. The cumulative increase in Brix of 3.9 degrees over 10 days is nearly double that of the unactivated formula. The increase from 8 degrees Brix (as seen on Day 1 prior to the first treatment) to 12 degrees Brix (as seen on Day 10 after the last treatment) in the tomatoes treated with the activated formula translates to estimated increases in crop yields of 10-50% or more, a higher quality, more nutrient dense tomato with an approximately 10-30% increase in value per unit and 10-14 day effective increase in shelf life compared to the control tomatoes.

Example 2. Maize

In another embodiment, a liquid nutrient formulation comprising dissolved phosphoric rock and iodine, along with an emulsion of kelp and fish was prepared for creating PAR activated nutrients for growing Maize (Corn).

The complete liquid preparation and its components were treated with the laser activation process as described in Example 1. Here, the individual components were treated separately and then mixed together to achieve the final activated composition.

The formulations were treated incrementally with an array of four laser beams, with each container holding 200 liters of the nutrient formulation. All four beams were applied to the nutrient solution at a trajectory allowing a full traverse of the beam from the surface to the bottom or opposite side of the container or conduit carrying the nutrient solution. Each of the lasers had a wavelength of 674 nanometers and a 60% phase cancellation of the beam was achieved using the optical device as described above.

As applied in this example for maize, a higher primary power laser was employed, specifically, having 12 milliwatts of power after phase cancellation for one of the systems. The number of lasers was reduced to three; however, with the higher power system and the average treatment time was reduced to five minutes while maintaining a treatment intensity averaging approximately 0.24 milliwatt minutes per liter.

For this study, hybrid corn at 90,000 seeds per hectare was used. The control corn was planted and cultivated with conventional fertilizers and/or nutrients in 60 plots of 1 hectare each adjacent to treated corn areas, for a total of 60 hectares. Group 2, comprising corn treated with an unactivated foliar spray of the liquid formula described above which is a combination of phosphoric rock and iodine in solution and kelp and fish in emulsion. Group 2 had plantings in 60 plots of land comprising 1-20 hectares each, for a total of 800 hectares. Group 3 included crops that were treated with the same foliar formula, however, in laser activated form, as described above. Group 3 also had plantings in 60 plots of land comprising 1-20 hectares each for a total of 800 hectares.

The foliar treatment protocol, for both unactivated and activated nutrient solutions, includes diluting an appropriate amount of the foliar formula into 100 liters of water depending upon the treatment stage, whereby the diluted formulation is then applied to the leaves and stems of plants over one hectare. The first application occurred when the corn reached the stage of the first three true leaves at a level of one liter of nutrient solution diluted in 100 liters of water per hectare. It should be appreciated that other crops may use an increased or decreased concentration of nutrient solution depending upon the plant type and growing conditions. The formula was applied twice more during the growth cycle, each of these at a level of two liters per hectare diluted in 100 liters of water. The total foliar formula delivery was 5 liters per hectare over the three applications. The dilutions and treatment protocols were the same for both Groups 2 and 3, with the only difference being that an activated nutrient solution (foliar formula) was used for Group 3. FIG. 5 is a table showing results in metric tons per hectare of production for Group 1 501, Group 2 502, and Group 3 503.

From the table in FIG. 5, it is seen that the Group 2 unactivated foliar nutrient solution increased the average yield by 27.4%, whereas the Group 3 laser activated foliar nutrient solution increased the yield by 69.7% when compared with Control Group 1, respectively. Using the method of analysis of variance, Group 2 and Group 3 produced yields that were statistically significantly greater than Control Group 1, and the yields of laser activated treatment Group 3 were also statistically significantly greater than treatment Group 2, all probability values with $p<0.05$. Thus adding the unactivated nutrient solution gave a statistically significant increase in yields over conventional methods alone. The activation of the nutrient solution using the method described herein, in turn, produced statistically significantly greater increases in yields than using the unactivated solution. The absolute increase in yield of the activated versus unactivated nutrient formula was 42.3% greater, and the relative increase in yield (69.7/27.4) was on the order of 2.54 times greater.

The above study was conducted in Mexico, which has achieved relatively high yields in tough soil conditions. Therefore, embodiments of the present specification are relevant to substantially increasing production and yield under less than optimal soil and water conditions.

In addition to increasing production and yield, the study indicated a substantial increase in nutritional value of maize treated with the laser-activated nutrient solution (laser-activated foliar formula), as shown in FIG. 6. Table 4, shown in FIG. 6, illustrates comparative Brix degrees and micronutrient (Iodine, Mo, Fe, Zn, Mn, Cu, as shown in column 601) levels (expressed in parts per million) as an average of 25 samples for each of Group 1 in column 602, Group 2 in column 603 and Group 3 in column 604. The Brix degree in Group 2 was increased an average of 42% and Group 3 further increased by 62% over the Group 1 control, respectively. Micronutrient densities for minerals in Group 2 were increased for all values assessed, ranging from 50% to 133% greater than that of the Group 1 control. Micronutrient densities for minerals in Group 3 in all cases were greater than those in Group 2 with a range of 69% to 186% greater than that of the Group 1 control. Column 605 shows ratios representing the increase of mineral delivery of Group 3 compared to Group 2, calculated by taking the difference between the Group 3 value and the untreated control group and dividing that amount by the difference between the Group 2 value and the untreated control group. In every case, the micronutrient density using the activated nutrients was greater than using the unactivated nutrient formula with a range of 13% to 25% greater.

Example 3. Beans (i.e. Black and/or Brown Beans)

In another embodiment, a liquid solution and emulsion comprising iodine, kelp, fish emulsion, phosphoric rock compound and magnesium sulfate was prepared for creating laser activated nutrients for growing black or brown beans.

The complete liquid preparation and its components were treated with the laser activation process as described in Example 2. In another embodiment, the individual components were treated separately and then mixed with the other treated components to achieve the final activated composition.

As in Example 2, the foliar formula for beans was diluted into 100 liters of water and this was then applied to one hectare of cultivated land. The foliar formula, both without and with laser activation, was applied four times during the growing cycle. The first two applications used 1 liter of foliar formula per 100 liters of water per hectare and the second two applications used 1.5 liters per 100 liters per hundred liters of water per hectare.

The control beans were planted and cultivated with conventional fertilizers or nutrients. Control Group 1 was planted in 32 plots of 1 hectare each adjacent to treated bean areas. Group 2, comprising plantings in 32 plots of land of about 1-10 hectares each for a total of 200 hectares, was treated with unactivated foliar formula, which contained phosphoric rock and iodine in solution and kelp and fish in emulsion along with magnesium sulfate. Group 3, also comprising plantings in 32 plots of land of about 1-10 hectares each for a total of 200 hectares, was treated with laser activated foliar formula, which was identical to the formula used for Group 2 except that the formula was activated with the process described above.

The actual results from the study are shown in FIG. 7, represented in Kg per hectare yields. Column 701 shows the yield with the conventional control group of beans, Column 702 shows the yield of Group 2 unactivated foliar-sprayed plants, and Column 703 lists the yield of laser-activated foliar-sprayed plants. Unactivated foliar treatment increased the yield by 22.6%, while treatment with the laser-activated foliar increased the yield by 58.9%. Using the method of analysis of variance, Group 2 and Group 3 produced yields that were statistically significantly greater than control Group 1, and the yields of laser activated treatment Group 3 were also statistically significantly greater than treatment Group 2, all probability values with $p<0.05$. Thus adding the unactivated nutrient solution provided a statistically significant increase in yields over conventional methods alone. The activation of the nutrient solution using the method described herein, in turn, produced statistically significantly greater increases in yields than using the unactivated solution. The absolute increase in yield of the activated versus unactivated nutrient formula was 46.3% greater, and the relative increase in yield (58.9/22.6) was on the order of 2.6 times greater.

In addition to increasing production and yield, the study indicated substantial increase in nutritional value of beans treated with the laser activated foliar formula. The range of values expressed in FIG. 8, Table 6 represent the average of 5 plant samples for each of the Groups 1 (shown in Column 802), Group 2 (shown in Column 803) and Group 3 (shown in Column 804) for comparative micronutrient (Cu, Zn, and Fe as shown in Column 801) levels (expressed in parts per million) in control beans, foliar-sprayed beans, and beans that were sprayed with laser-activated foliar.

For ease of comparison the midpoint values of each of the ranges are used. To be able to make a mathematical comparison the conservative assumption is made that the copper value for the control beans is 0.5 parts per million, though the actual value could be well below this level depending on the sensitivity of the assay method, 0.5 ppm being the highest level that the assay method would be likely to read as 0 ppm being present. Column 805 shows ratios representing the increase of mineral delivery of Group 3 compared to Group 2, calculated by taking the difference between the lower end of the Group 3 range and the lower end of the untreated group range and dividing that amount by the difference between the lower end of the Group 2 range and the lower end of the untreated group range. Micronutrient densities for minerals in Group 2 were increased for all values compared to Group 1 control, ranging from 100% to 200% greater. Micronutrient densities for minerals in Group 3 in all cases were greater than those in Group 1 control with a range of 400% to 1400% greater. In every case, the micronutrient density using the activated nutrients was greater than using the unactivated nutrient formula with a range of 129% to 400% greater.

General Observations

Additional tests across dozens of types of produce, including 30 varieties of corn, have shown that in every instance there is a significant increase in the growth of the plant and the level of yield and quality of that yield with laser activated, as opposed to non-activated nutrient formulas. The other crops that had a positive impact include other grains such as rice, wheat, barley and amaranth; beans of many varieties including soybeans and green grams; fruits including bananas, mangoes; and many types of berries including blueberries, strawberries, and raspberries; cotton and peanuts; and many types of vegetables.

In other embodiments, the yield and nutrient density of rice are significantly increased. The strength of the resultant rice increased such that breakage during processing dropped from 10-14% to about 2-3%, increasing net effective yields about 50% and producing a crop of greater nutrient quality, higher resistance to pests, and longer shelf life. In one embodiment, an increase from 9.6 metric tons per hectare (lower quality yield) to 13.7 metric tons per hectare (higher quality yield) was seen. Yield quality is quantified by Brix degree, with the Brix degree of the lower quality yield at 0.89 and the Brix degree of the higher quality yield at higher quality yield at 0.97. For the lower quality yield, a 10-12% loss of product was experienced upon husk removal and is factored into the 9.6 metric ton per hectare yield, assuming an average 11% loss. For the higher quality yield, the loss was reduced to 2-4% and is factored into the 13.7 metric ton per hectare yield, assuming an average 3% loss. The effective yield can be calculated using the following formula:

$$\text{Effective Yield} = \text{Metric Tons per Hectare} \times \text{Measured Brix Degree} \quad \text{Equation 1.}$$

Using the average of an 11% loss for the lower quality yield and a 3% average loss for the higher quality yield, the effective yield of the crops is as follows:

$$13.7 \text{ Metric Tons per Hectare} \times 0.97 \text{ Brix Degree} = 13.289 \text{ Effective Yield (Higher Quality)} \quad \text{Equation 2.}$$

$$9.6 \text{ Metric Tons per Hectare} \times 0.89 \text{ Brix Degree} = 8.544 \text{ Effective Yield (Lower Quality)} \quad \text{Equation 3.}$$

$$13.289 \text{ (Higher Quality Effective Yield)}/8.544 \text{ (Lower Quality Effective Yield)} = 1.555, \text{ or a } 55.5\% \text{ increased net effective yield of the higher quality, more nutrient dense rice.} \quad \text{Equation 4.}$$

The various embodiments of the present specification have numerous benefits that include increase in yield per hectare, increase in plant nutritional value, reduced input costs due to elimination of chemical fertilizers, improved soil quality and regeneration due to increased nitrogen fixation from the air, reduced requirements for chemical nitrates by as much as 80%, reduced dependency on, or elimination of pesticides, enhanced sugar content and taste, purification of water table by reducing applied chemicals such as nitrates, greater value per metric ton, and prolonged shelf life. All of the above benefits deliver significant value in the chain of agricultural production.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive.

We claim:

1. A nutrient solution for applying to agricultural products prepared by a process comprising the steps of:
    forming an unactivated nutrient solution; and
    applying to said unactivated nutrient solution a plurality of ultra-rapid impulses of modulated laser light, wherein said ultra-rapid impulses are defined as impulses with molecular traverse rates on the order of 100 nanoseconds to 0.01 femtoseconds, wherein the nutrient solution is a photoacoustically activated form of the unactivated solution and comprises water (H2O) and at least one of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), Chromium (Cr) or zinc (Zn).

2. The nutrient solution of claim 1, wherein said modulated laser light is applied from at least one laser to said unactivated nutrient solution.

3. The nutrient solution of claim 2, wherein said at least one laser has a wavelength in a range of 400 to 750 nanometers and a power output in the range of 1 to 1000 milliwatts, when adjusted for the minimum degree of phase cancellation of the laser output.

4. The nutrient solution of claim 2, wherein said at least one laser has a power output in the range of 0.4 to 400 milliwatts, when adjusted to 60% phase cancellation.

5. The nutrient solution of claim 2 wherein said unactivated nutrient solution is housed in a container and wherein said at least one laser emits a beam that is configured to be applied to the nutrient solution at a trajectory that allows a full traverse of the beam from a first surface of the container to an opposing surface of the container.

6. The nutrient solution of claim 2 wherein said unactivated nutrient solution is housed in a first container and transported to a second container via a conduit, wherein at least one laser emits a beam that is configured to be applied to the nutrient solution at a trajectory that allows a full traverse of the beam through said conduit.

7. The nutrient solution of claim 1, wherein the laser light is modulated with an optical device comprising a first diffraction grating, a refractive element, and a second diffraction grating and wherein the optical device cancels a portion of the laser radiation to produce a pattern of interference of constructive and destructive nodes.

8. The nutrient solution of claim 7, wherein the laser light is modulated such that a substantial majority of destructive nodes are generated relative to constructive nodes.

9. The activated nutrient solution of claim 1, wherein said modulated laser light is applied from three lasers.

10. The activated nutrient solution of claim 1, wherein said modulated laser light is applied from four lasers.

11. A method of cultivating agricultural products comprising applying the nutrient solution of claim 1 to a plurality of said agricultural products, wherein after said application, a portion of the plurality of said agricultural products have an increased yield per hectare in a range of 10% to 50% relative to agricultural products cultivated with an unactivated nutrient solution.

12. The method of claim 11, wherein the agricultural products comprise at least one of wheat, rice, maize (corn), millet, barley, rye, amaranth, sugarcane, pumpkin, cassava, soybeans, beans, mung beans, lentils, hay, potatoes, cotton, rapeseed, radish, lettuce, broccoli, spinach, carrots, green peas, cucumber, tomatoes, peppers, onions, coffee, tea, chicory, peanuts, rubber, yams, sunflowers, palms, mustard, coconuts, cocoa, olives, nuts including almonds, walnuts and cashews, and other grains, nut, vegetables or fruits.

13. A method of cultivating agricultural products comprising applying the nutrient solution of claim 1 to a plurality of said agricultural products, wherein, within one hour after said application, a portion of the plurality of said agricultural products have an increased Brix degree in a range of 10% to 50% relative to agricultural products cultivated with an unactivated nutrient solution.

14. The method of claim 13, wherein the agricultural products comprise at least one of wheat, rice, maize (corn), millet, barley, rye, amaranth, sugarcane, pumpkin, cassava, soybeans, beans, mung beans, lentils, hay, potatoes, cotton, rapeseed, radish, lettuce, broccoli, spinach, carrots, green peas, cucumber, tomatoes, peppers, onions, coffee, tea, chicory, peanuts, rubber, yams, sunflowers, palms, mustard, coconuts, cocoa, olives, nuts including almonds, walnuts and cashews, and other grains, nut, vegetables or fruits.

\* \* \* \* \*